PRINTED MATRIX BOARD ASSEMBLY

Filed Aug. 21, 1961 2 Sheets-Sheet 1

INVENTORS
Peter K. Gerlach
George J. David
Rudolph O. Stoehr
BY C. A. Gulbrandsen
Atty.

July 6, 1965 P. K. GERLACH ETAL 3,193,731

PRINTED MATRIX BOARD ASSEMBLY

Filed Aug. 21, 1961 2 Sheets-Sheet 2

United States Patent Office 3,193,731
Patented July 6, 1965

3,193,731
PRINTED MATRIX BOARD ASSEMBLY

Peter K. Gerlach, Lake Forest, George J. David, Chicago, and Rudolph O. Stoehr, Des Plaines, Ill., assignors to Automatic Electric Laboratories, Inc., Northlake, Ill., a corporation of Delaware Filed Aug. 21, 1961, Ser. No. 132,897
2 Claims. (Cl. 317—101)

This invention relates to printed circuit boards and, more particularly, to a matrix board assembly to which crosspoint switching elements are mounted. Preferably, these elements may be reed relays of the general type disclosed in copending application Serial No. 127,648, filed July 28, 1961, now Patent No. 3,128,356. Crosspoint Relays by Lychyk and Taliste assigned to the common assignee. Reference is made to this prior application for purposes of disclosure.

The invention is an improvement of the matrix board assembly disclosed in copending application entitled Crosspoint Switching Array, Serial No. 127,237, filed July 27, 1961, by K. K. Spellnes and E. J. Glenner.

In the Spellnes and Glenner application relays having four reed switch capsules are mounted between cross coordinate conductors, that is, at the crosspoints of vertically oriented and horizontally oriented conductors. These relays lie in a parallel plane with the mounting board and parallel to the vertical conductors. Two parallel groups of terminal pins are connected to the two ends of the capsules and are inserted into corresponding apertures placed in the board. Furthermore, these two groups of terminal pins are aligned normal to the vertical conductors and parallel to the general direction in which the horizontal conductors extend. Since to connect strictly straight line horizontal conductors to pins that are aligned in an equally straight line and positioned parallel to the conductors, only two conductors, one on each side of the line of terminal pins, is connectable without incurring overlap. To remove this limitation the horizontal conductors of the matrix board according to the embodiment shown in greater detail in the copending application are laid out in a substantially serpentine pattern. This pattern enables one group of terminal pins extending from the one end of the relay to be connected to four horizontally oriented conductors and the other group of terminal pins extending from the opposite end of the relay connected to four vertical conductors.

In contrast, the matrix board assembly of the present invention solves the problem of connecting the relay terminal pins to the conductors by a design such that, preferably end-mounted, relays which have four groups of terminal pins, one group arranged along each of the four sides of a rectangular shaped relay base may be accommodated. Thus, instead of the terminal pins being arranged in groups of two they are arranged in groups of four. Each group is connectable to either vertical or horizontal conductors. This arrangement expands the number of connections that can be made between terminal pins and conductors without overlap. Moreover, the design of this matrix board materially reduces the mounting space required for a given number of relays by virtue of the fact that more connections can be made in the area where a set of vertical conductors crosses a set of horizontally oriented conductors. Thus, the assembled package is more compact than is the package according to the Spellnes et al. disclosure.

The matrix board assembly features according to the preferred embodiment two cards which are bonded together. Each of these cards carry conductors which are insulated from each other yet may be interconnected by the aforementioned crosspoint elements which are arranged in planes normal to the plane of the board and whose terminal pins are inserted into correspondingly arranged apertures in the board. More particularly, one of the cards is relatively thick in comparison to the other card of the board for providing the necessary support and rigidity to the mounted elements. The other card or cards are accordingly thin and are used principally to insulate cross coordinate conductors from each other.

The terminal pins of the relays extend through the apertures and are connected to the conductors via termination pads or conductor eyelets which extend from the conductor to the apertures. The termination pads surround the apertures and, therefore, a terminal pin extending therethrough is connectable by application of solder. Thus, the pads provide continuity between the terminal pins and the conductors, for example, the vertical and horizontal conductors.

In instances where the terminal pins are connected to conductors which lie interposed adjacent cards, such as the horizontal conductors in the instant case, clearance holes or apertures of a larger diameter are present to expose the area of connection or soldering. The purpose of this design is to insure a good connection between the horizontal conductors and the respective terminal pins. On the other hand, where the crosspoint elements are connected to vertical conductors, the larger size clearance holes are not present as the area for soldering is already exposed.

It should be apparent then that the relays are mounted on a side of the supporting board opposite the side of the conductors. Moreover, the row or horizontal conductors are disposed on this thick card and lie interposed between this card and the thin card. The column or vertical conductors lie insulated therefrom on the thin card. Thus, soldering of the matrix takes place for example from the bottom of the board and not from the top or relay side of the board. It is for this reason that the thin card contains the larger apertures.

The principal object of the invention is to provide a printed circuit board assembly which makes maximum use of the available space and which can accommodate a maximum number of vertical and horizontal conductors without overlap.

Other objects and features of the invention will become more apparent from a perusal of the following detailed description taken in connection with the accompanying drawings of which:

Figures 1, 2, 3:
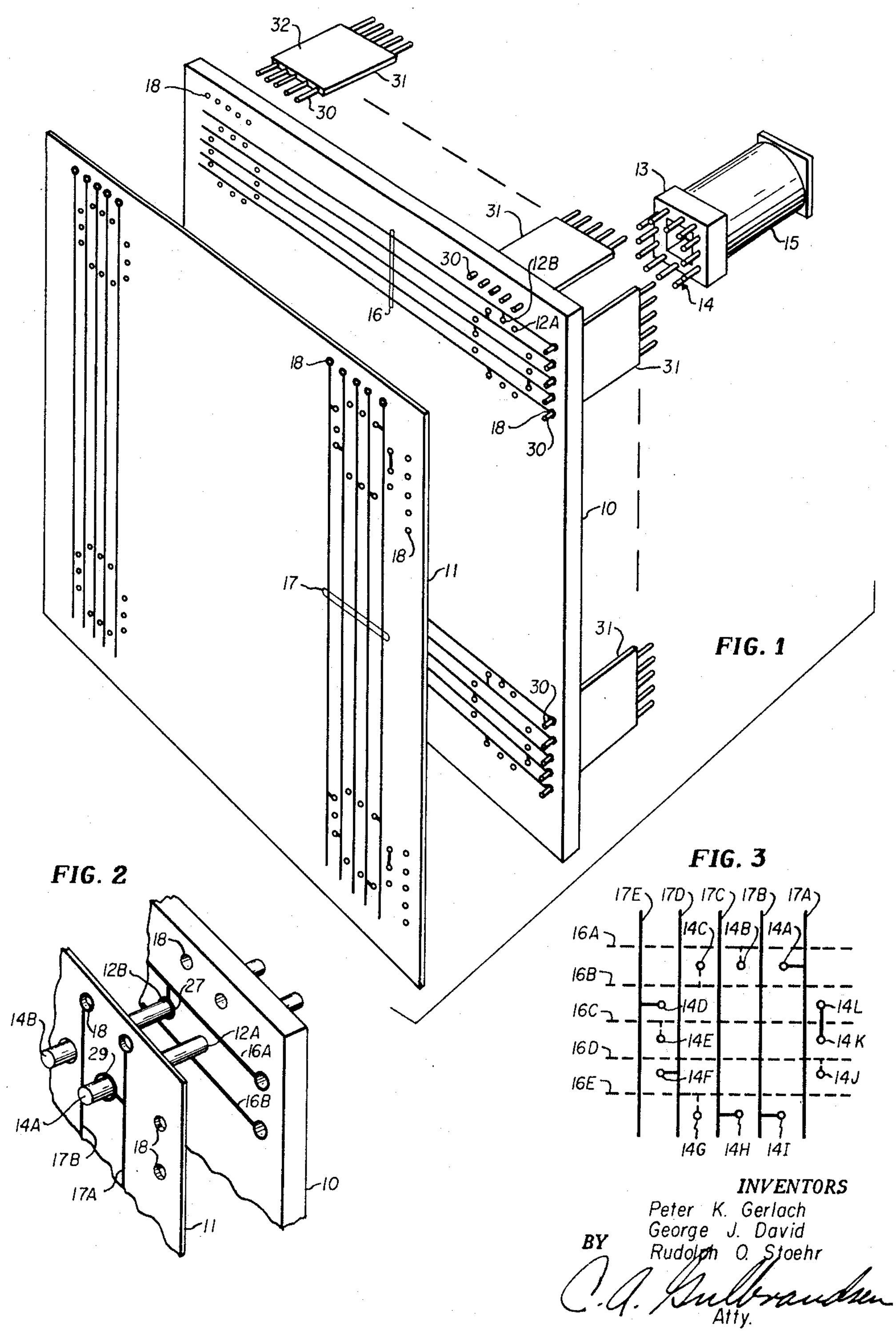
FIG. 1 is an exploded perspective view showing the arrangement of the matrix board assembly according to the invention.
FIG. 2 is a sectional exploded view of the matrix board shown in FIG. 1 showing in particular the relationship of the relay terminal pins, the mounting apertures, and the vertical and horizontal conductors.
FIG. 3 is a schematic view showing one example of how a crosspoint reed relay having four switch capsules may be connected to the vertical and horizontal conductors of a matrix board according to the invention.

Referring now to FIG. 1 of the drawings which shows one embodiment of the invention. Characters 10 and 11 denote two printed circuit cards which are made of a dielectric material and bonded together. Cards 10 and 11 are characterized by being a relatively thick card and a relatively thin card respectively. Also, card 10, that is the thick card, carries on its bottom side as viewed in the drawings a number of printed row or horizontal conductors 16 which are in turn connected to a number of termination pads 27 which are also carried by the card. In a like manner printed column or vertical conductors 17 connected to corresponding termination pads 29 are carried on the bottom side of card 11. Therefore, termination pads 27 and 29 serve as linking conductors between terminals 14 and conductors 16 and 17 respectively. Both coordinate conductors 16 and 17 terminate along edges of the board in termination apertures 18. The horizontal conductors 16 terminating in apertures aligned along the vertical edge of the board and the vertical conductors terminating in apertures aligned along the horizontal edge of the board. Positioned in groups of 12, for example, are a plurality of apertures 12 which extend completely through the board and are laid out in a substantially rectangular configuration. According to the embodiment shown the configuration includes three apertures on each side of the rectangle.

Also, according to the embodiment shown is a number of terminal blocks 31 which are mounted from the top side of the multi-layer board and used to connect the matrix board assembly to an external circuit not shown. Each of the terminal blocks comprise an arbitrary number of terminal pins 30, depending upon how large a terminal block is wanted, which are embedded in both ends of a block of insulating material 32. Those pins extending from the one end of the block are insertable into the aforementioned termination apertures 18 and those extending from the opposite end are connectable to the external circuit.

Reference is now made to FIG. 2 which shows the relationship of terminal pins 14 and apertures 12 and more specifically how two typical terminal pins 14A and 14B may be connected to two typical vertical end horizontal conductors 17A and 16A respectively. Terminal pins 14A and 14B extending from relay base 13 are inserted directly into corresponding apertures, that is without special means such as tube type receptacles. The pins extend through the board in either one of two ways, depending on which conductors the pins are to be connected to: either in a relatively tight relationship with respect to both cards or in a tight relationship with respect to only the thick card, and a loose relationship or clearance relationship with respect to the thin card. Clearance is achieved by making apertures in the thin card larger in size than the cross-section of the terminal pins. This exposes the junctions that terminals 14 make with termination pads 27 from the bottom of card 11, which forms the bottom surface of the support board, and thus enables solder to flow to the junction and complete the connection. The tight fit with respect to the thick card is common to all the pins for purposes of support. The clearance fit with respect to the thin card is for purposes of facilitating the soldering operation required to solder the pins to interposed conductors. To illustrate, pin 14A is connected to termination pad 29 which in turn makes connection with vertical conductor 17A which is completely exposed from the soldered or bottom side of the board. Thus, applying solder to such a junction requires but the normal soldering technique and the terminal pin can accordingly be tight with respect to the cards. In contrast pin 14B is connected to termination pad 27 which is connected to horizontal conductor 16A which lies between the adjacent cards. Solder will not flow to such a junction unless the aperture is substantially larger than the cross section of the pin and can flow to the interposed conductor. Therefore, the present invention features the enlarged apertures which serves to expose the junction area, that is, the termination pad and the terminal pin extending therethrough, and permits solder to flow thereto. The enlarged holes or clearance holes than are only present in the thin board and are located therein only in areas where the pins extending therethrough are connected to horizontal conductors 16 or to conductors which lie between adjacent cards. In cases where the pins are connected to conductors which are already exposed such as the vertical conductors, or more specifically to the termination pads connected thereto, the clearance apertures are not present.

Figure 4:
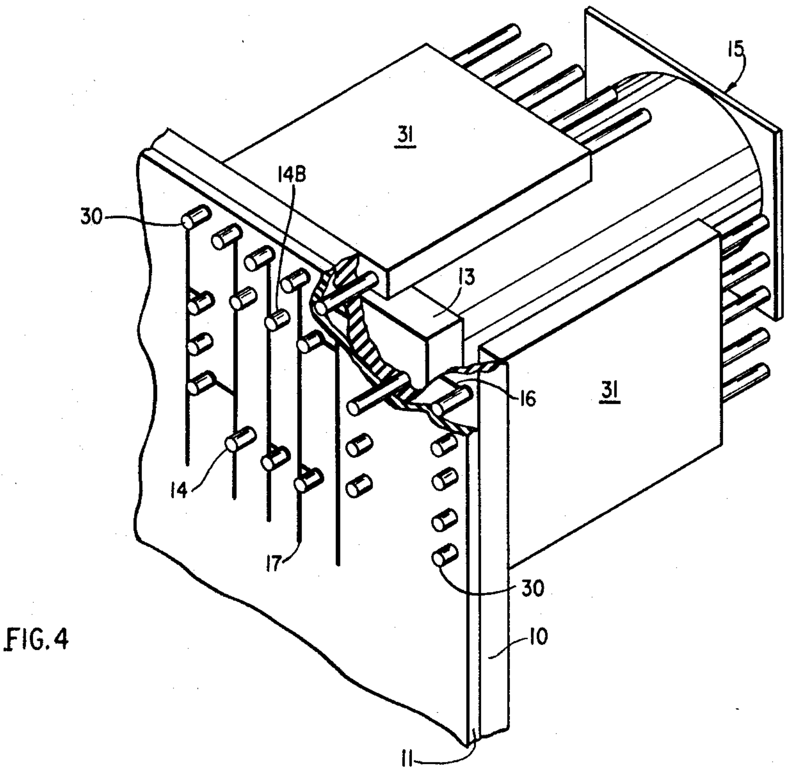
FIG. 4 is a view in perspective of a section showing a completed matrix board assembly.

FIGURE 4 illustrates the completed form of the assembly with cards 10 and 11 positioned into a laminate configuration or a multi-layer board, and relay 15 and terminal blocks 31 mounted on one side of it. While certain amount of heat is generated from the operation of the relays, it should now be apparent that it dissipates rapidly due to the fact that one end of the relay is opened to the atmosphere.

FIG. 3 of the drawings illustrates one connection pattern of an aforementioned type relay with the matrix board. Pin 14A, also shown in FIG. 2 is connected to vertical conductor 17A. Pin 14B is connected to horizontal conductor 16A and pin 14C is connected to conductor 16B. Pin 14D is connected to vertical conductor 17E, pin 14E connected to horizontal conductor 16C and pin 14F is connected to vertical conductor 17D. Pin 14G is connected to horizontal conductor 16E, pin 14H connected to vertical conductor 17C and pin 14I connected to vertical conductor 17B. Pins 14K and 14L are strapped together and are not connected to a specific cross-coordinate conductor according to this one embodiment. Pin 14J is connected to horizontal conductor 16D. The foregoing completes the connection of the relay to one group of vertical and horizontal conductors. In this connection it should be noted that each group of twelve apertures is located in an area where the vertical conductors cross the horizontal conductors or vice versa. These areas may for example extend over the entire card thereby providing space for mounting a corresponding array of crosspoint relays.

The specific embodiment shown includes the terminal blocks, however, it should be realized that there are a number of alternate methods of connecting a matrix board of the invention to an external circuit. For example, the board could have conductors which extend to the very edge of the individual cards thereby permitting the assembled board to be inserted into some sort of receptacle.

Also, it should be understood that although the preferred embodiment includes two cards, more than two can be used for the matrix board so long as the featured clearance holes of the thin cards are present to expose the area of connection between terminal pins and interposed conductors or termination pads.

There are still many other modifications and variations that could be made in the structure of the matrix board assembly without departing from the spirit and scope of the invention as hereinafter claimed.

What is claimed is:

1. A crosspoint matrix assembly comprising in combination: at least two cards of insulating material positioned adjacent and secured to each other with mounting apertures extending therethrough, said cards forming a flat multi-layer board, sets of printed conductors on said board forming a coordinate array of vertical and horizontal sets, said vertical conductor sets being carried on one surface of one of said cards and said horizontal conductor sets being carried on one surface of the other card in insulated relation to said vertical sets, a matrix of reed relays mounted perpendicular to, and on one side only of said board and each having a coil with two ends, a plurality of pairs of encapsulated switch contacts operated in response to the energization of said coil and four separate groups of terminals projecting with their free ends from one end of said relay into corresponding ones of said apertures, certain ones of said terminals terminating said coil ends and certain others of said terminals terminating said contacts, and said four groups of terminals and apertures being disposed substantially along the four sides of a rectangle which overlaps the rectangular area of projected intersection of the respective vertical conductor set and the respective horizontal conductor set, so that at least some of said vertical and horizontal conductors extend between adjacent vertical and horizontal lines respectively of said terminals, first linking conductors printed on said first-mentioned surface and connecting the terminals terminating one end of said coil and one contact of each said pair separately to corresponding conductors of the respective vertical set, and second linking conductors printed on said second-mentioned surface and connecting the terminals terminating the other end of said coil and the other contact of each said pair separately to corresponding conductors of the respective horizontal set.

2. A crosspoint matrix assembly as claimed in claim 1 wherein said vertical conductor sets are carried on a surface of said one card which forms the other side of said board, said card forming the insulation of said horizontal conductor sets carried by the other card and including selected apertures of larger size than the apertures in said other card and than the cross-section of said terminals extending therethrough to expose the junctions of said terminals and corresponding ones of said second linking conductors from said other side, and to enable solder to flow thereto from said other side whereby the connection between said terminals and said second linking conductors is completed.

References Cited by the Examiner

UNITED STATES PATENTS

| | | | |
|---|---|---|---|
| 2,756,485 | 7/56 | Abramson et al. | 317—17 |
| 2,889,424 | 6/59 | Glore et al. | 200—87 |
| 3,030,451 | 4/62 | Jacobson | 200—87 |
| 3,086,085 | 4/63 | Palm | 200—87 |

FOREIGN PATENTS

| | | |
|---|---|---|
| 233,658 | 4/61 | Australia. |

OTHER REFERENCES

Electronics (B), E. C. Hall et al., October 9, 1959, page 65, see FIG. 4.

Electronics: "Stress Board and Component Miniaturization," March 10, 1961; pages 205, 210.

JOHN F. BURNS, *Primary Examiner.*